United States Patent [19]

Hartemann et al.

[11] Patent Number: 4,835,391
[45] Date of Patent: May 30, 1989

[54] CERENKOV ELECTROOPTIC SHUTTER

[75] Inventors: Frederick Hartemann, Paris, France; George Bekefi, Brookline, Mass.

[73] Assignee: The United States of America as represented by the Secretary of the Air Force, Washington, D.C.

[21] Appl. No.: 68,977

[22] Filed: Jul. 1, 1987

[51] Int. Cl.$^4$ .......................... G21K 4/00; G02F 1/03
[52] U.S. Cl. ................................ 250/361 R; 350/356
[58] Field of Search .................. 250/361 R, 475.2; 350/356

[56] References Cited

U.S. PATENT DOCUMENTS

| | | | |
|---|---|---|---|
| 3,049,619 | 8/1962 | Genovese, Jr. | 250/362 |
| 3,718,818 | 2/1973 | von Arx et al. | 250/361 R |
| 4,215,274 | 7/1980 | Segall | 250/361 R |
| 4,389,568 | 6/1983 | Dowdy et al. | 250/362 |
| 4,429,228 | 1/1984 | Anderson | 250/374 |
| 4,497,769 | 2/1985 | Nicholson et al. | 376/257 |
| 4,510,441 | 4/1985 | Yasuda et al. | 324/96 |
| 4,524,385 | 6/1985 | Billingsley et al. | 358/113 |
| 4,618,819 | 10/1986 | Mourou et al. | 324/77 K |

FOREIGN PATENT DOCUMENTS 330792  7/1972  U.S.S.R. .......................... 250/361 R

OTHER PUBLICATIONS

Kinsey A. Anderson, "Luminescent Effects in Photomultiplier Tube Faces and Plexiglas [sic] Cerenkov Detectors" The Review of Scientific Instruments, vol. 30, No. 10 (Oct., 1959) pp. 869-873.

R. Giese, O. Gildemeister, W. Paul and G. Schuster, "A High Resolution Cherenkov Chamber" *Nuclear Instruments and Methods*, vol. 88, No. 1 (1970) pp. 83-92.

"Time-resolved studies of intense, relativistic electron beams with a subnanosecond Cerenkov electro-optic shutter" by F. Hartemann and G. Bekefi *Appl. Phys. Lett.* 49(25) 22 Dec. 1986 pp. 1680-1682.

*Primary Examiner*—Janice A. Howell
*Assistant Examiner*—Constantine Hannaher
*Attorney, Agent, or Firm*—William G. Auton; Donald J. Singer

[57] ABSTRACT

A system which couples Cerenkov emission with a gated electrooptic effect to allow viewing of Cerenkov radiation in sub nanosecond time-scales is disclosed. Cerenkov radiation is generated by transmitting an electron beam through a transparent medium with a high index of refraction. The Cerenkov radiation is then gated into a sample pulse of subanosecond duration by an electrooptic crystal which has an index of refraction controlled by an electric field. the electrooptic crystal is opaque to the Cerenkov radiation until receiving a 6.0 kV voltage for about 750 picoseconds, upon which a pulsed sample of Cerenkov radiation is transmitted to a display system.

2 Claims, 2 Drawing Sheets

CERENKOV ELECTROOPTIC SHUTTER

STATEMENT OF GOVERNMENT INTEREST

The invention described herein may be manufactured and used by or for the Government for governmental purposes without the payment of any royalty thereon.

BACKGROUND OF INVENTION

The present invention relates generally to detectors which detect charged subatomic particles, and more specifically to a diagnostic device which allows direct viewing of Cerenkov radiation beam dynamics at subnanoseconds time-scales.

The experimental study of intense relativistic electron beam dynamics at subnanosecond time-scales is a subject of considerable interest. In this range, electromagnetic waves travel over distances of a few centimeters and collective behavior cyclotron effect and instability growth can be resolved in many important instances.

Among the numerous diagnostics designed for such studies, those allowing a direct viewing of the beam dynamics are of special interest: they offer a simple and accurate description of particle motion and permit fast interactive scanning of the experiment parameters. Unfortunately, intense relativistic electron beams are prone to various instabilities with growth times of tens to hundreds of picoseconds. Even if the electron beam is macroscopically stable, the beam quality, namely, the emittance and brightness, may well be strongly time dependent. Such is the case of electron beams produced by guns with field emission cathodes, photoelectric cathodes, and laser driven field emission cathodes. The task of detecting and observing Cerenkov radiation is alleviated to some extent, by the systems disclosed in the following U.S. Patents, the disclosures of which are incorporated by reference: U.S. Pat. No. 3,049,619 issued to F. Genovese; U.S. Pat. No. 4,429,228 issued to D. Anderson; U.S. Pat. No. 4,389,568 issued to E. Dowdy et al; and U.S. Pat. No. 4,497,769 issued to N. Nicholson et al.

U.S. Pat. No. 4,497,769 discloses a portable instrument for measuring induced Cernekov radiation associated with irradiated nuclear fuel assemblies. U.S Pat. No. 3,040,619 discloses a differential Cerenkov counter for detecting and counting charged subatomic particles. U.S. Pat. No. 4,429,228 discloses a photoionization detector which is an x-ray imaging device.

U.S. Pat. No. 4,389,568 discloses a method for monitoring irradiated fuel inventories located in a water-filled storage pond. In this system, by E. Dowdy et al, the intensity of the Cerenkov radiation emitted from the water in the vicinity of the nuclear fuel is measured.

The above-cited references are exemplary in the art of detecting Cerenkov radiation. Particularly of note is the Nicholson et al reference, which discloses a photometric imaging system which measures induced Cerenkov radiation associated with irradiated nuclear fuel assembles.

Unfortunately, most of the imaging techniques available to date do not give both good space and time resolution. One obtains either spatially resolved, time-integrated pictures (cameras, fluorescent screens etc.), or space integrated, real time measurements (photomultipliers tubes, pin photodiodes, image intensifiers, etc.). More sophisticated diagnostics, such as the magnetooptic shutter, reduce the integration times down to the microsecond range with a good spatial resolution, and optical gates of a few tens of nanoseconds can be obtained with a microchannel plate, but in many instances these time scales are still much longer than those characteristics of the beam dynamics. The streak camera is a very fast diagnostic (typical streak velocity of the order of 1 mm/ns) able to resolve subnanosecond events; its main drawback being that it basically works as a one-dimensional imaging device since one axis of the picture is lost to the streak process.

In view of the foregoing discussion, it is apparent that there currently exist the need for a Cerenkov electrooptic detection system which allows direct viewing of Cerenkov radiation beam dynamics at subnanosecond time-scales. The present invention is intended to satisfy that need.

SUMMARY OF THE INVENTION

The present invention includes an electrooptic shutter, whose use allows Cerenkov radiation beam dynamics to be observed at subnanosecond time scales. One embodiment of this invention achieves time resolution within a few tens of picoseconds using: an electron beam source, a Plexiglas plate, collimating optics, the electrooptic shutter, an image intensifier, a camera, and a controlled power source.

The electron source is used to emit an electron beam through the Plexiglas plate. The electron beam, when travelling through a high-index transparent medium, produces Cerenkov radiation. In the case of Plexiglas (polymethyl methacrylate) n approximately equals 1.7 (in the UV) and one obtains time-resolved Cerenkov radiation with a threshold voltage of about 120 KV.

The Cerenkov radiation is collimated by the collimating optics, and conducted to the electrooptic shutter system, where it is gated for a few hundred picoseconds. One embodiment of the electrooptic shutter entails: a polarizer, an electrically-gated electrooptic crystal, and an analyzer. The polarizer receives and polarizes the collimated Cerenkov radiation from the collimating optics.

The electrooptic crystal is very fast (subnanosecond) optical gate, which receives and samples the polarized Cerenkov radiation from the polarizer, and outputs the gated sample through an analyzer to the camera. In one embodiment of the invention, the electrooptic crystal is a KDP crystal which is controlled by a power supply with a 720 picosecond gate. In this embodiment, the time resolution of the electrooptic shutter is in the picosecond range.

The image intensifier is used to intensify the sample of the Cerenkov radiation from the electrooptic crystal onto the film of the camera. This image intensifier is necessary because the amount of light transmitted through the optical gate is very small, and generally below the threshold of 35 mm film.

The power supply system is used to power the electron beam source, the electrooptic shutter, and the image intensified system. The power requirements for the electron beam source will vary with the particular source selected. The present invention can use commercially available systems such as the Nereus or the Pulserad system as the source of the electron beam. The Pulserad power requirements are approximately 2.0 MV.

The electrooptic shutter uses 0–6.0 KV with a 720–750 picosecond gate. The image intensifier requires about 800 V.

The system described above provides both good space and good time resolution, and allows direct viewing of Cerenkov radiation beam dynamics at subnanosecond time-scales. Accordingly, it is an object of the present invention to provide an electrooptic shutter which samples beams from optical sources in the picosecond range.

It is another object of the present invention to provide an optical imaging system capable of resolving subnanosecond events.

It is another object of the present invention to allow direct viewing of Cerenkov radiation beam dynamics at subnanosecond time-scales.

These objects together with other objects, features and advantages of the invention will become more readily apparent from the following detailed description when taken in conjunction with the accompanying drawings wherein like elements are given like reference numerals throughout.

DESCRIPTION OF THE PREFERRED EMBODIMENT

The present invention includes an imaging system with a gated electrooptic shutter which is capable of resolving subnanosecond events, and giving high quality two dimensional images on regular 35 mm film.

The operation of the present invention entails a process which includes three steps. The first step is the generation of Cerenkov radiation by transmitting an electron beam through a high-index transparent medium. In this first step, an optimum medium is a sheet of Plexiglas (polymethyl methacrylate), which has an index of about 1.7. An example of a suitable electron beam source is a commercially-available multielectrode field emission gun 9 (1.6 MV, 1 kA, 30 ns). A suitable sheet of Plexiglas (polymethyl methacrylate) is a polymethyl methacrylate sheet (10 cm×10 cm, 3−10 mm thick) coated on the beam side with graphite so as to prevent direct light from the cathode-anode gap from reaching the optical system.

The second step entails sampling the Cerenkov radiation using an electrooptic shutter gated for a few hundred picoseconds. The electrooptic shutter uses two polarizers, and a gated electrooptic crystal to produce the effect of a Pockels cell. The incoming Cerenkov radiation is polarized, then propagates through the crystal which rotates its polarization proportionally to the applied voltage via the electrooptic effect, and is finally analyzed by a second polarizer perpendicular to the first one. One suitable electrooptic shutter is the Lasermetrics model 1041 FW electrooptic modulator.

Note that this second polarizaer is actually used as a photodetector which will output a detection signal when receiving Cerenkov radiation from the electrooptic crystal. Such photodetectors are deemed to be known in the art and need not be described further herein.

The third step of the invention entails enhancing the light from the electrooptic shutter and filming it on 35 mm film. For subnanosecond events, the number of photons propagating through the electrooptic shutter is small. Therefore, the image intensifier is necessary to enhance the Cerenkov radiation so that it attains the threshold of 35 mm film.

Figure 1:
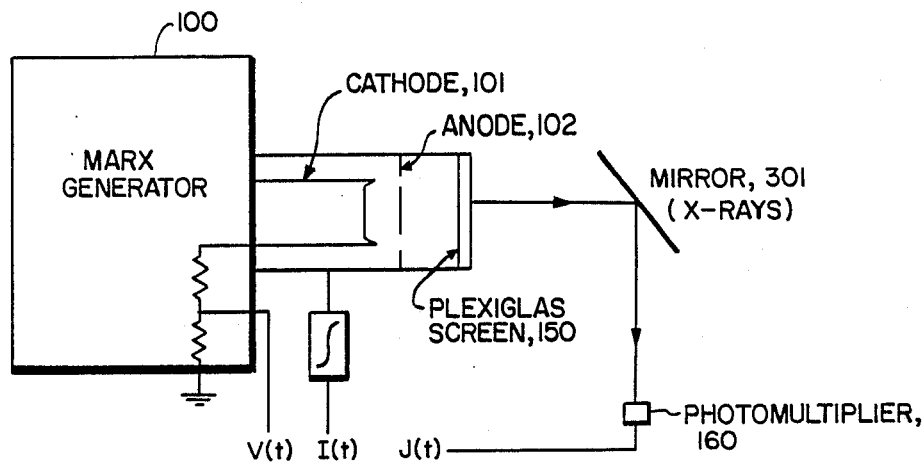
FIG. 1 is an electrical schematic of a system which generates Cerenkov radiation.

The reader's attention is now directed towards FIG. 1, which depicts an electrical schematic of a system which generates Cerenkov radiation by emitting an electron beam through a Plexiglas screen 150. The system of FIG. 1 generates a mildly relativistic (100–200 kV) hollow electron beam by the annular field-emission cathods of an electron beam source 100. Although a Marx generator is depicted as the electron beam source in FIG. 1, a variety of commercially available systems may be used to produce the electron beam.

The system of FIG. 1 is energized directly by the Marx generator 100, without a transmission line, thus producing long pulses (∼500 ns). The back of the Plexiglas (polymethyl methacrylate) plate 150 is coated with aerodag graphite to avoid looking at the diode plasma and charging up the plate. When the electron beam, at relativistic velocity V propagates through the Plexiglas (polymethyl methacrylate) plate 150, which has a refractive index of n, it generates an electromagnetic shock wave in the form of Cerenkov radiation, if $v \geq v_g = c/n$, where $v_g$ is the group velocity of the emitted light for the case of an electron beam, accelerated by a potential V, the Cerenkov threshold condition is:

$$V \geq \frac{m_0 c^2}{c} \left[ \left( 1 - \frac{1}{n^2} \right)^{-\frac{1}{2}} - 1 \right]$$

Figure 2:
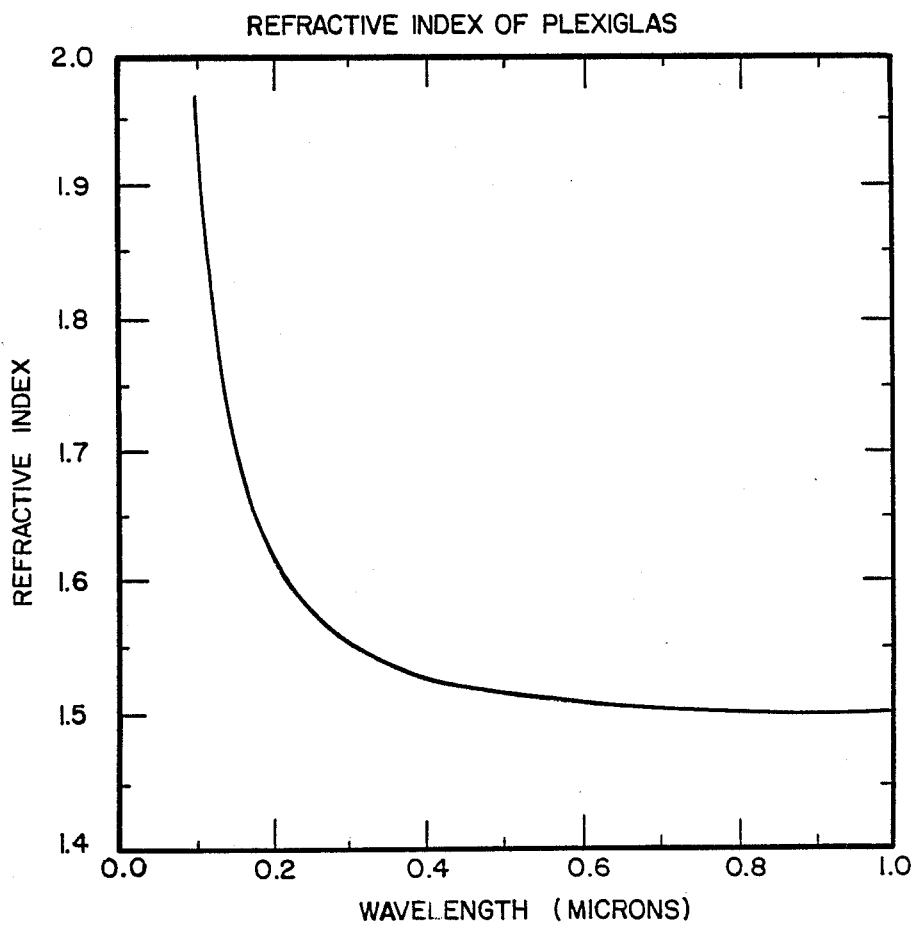
FIG. 2 is a chart which correlates the refractive index of plexiglas with respect to wavelength.

In the present invention, Plexiglas (polymethyl methacrylate) was chosen as the transparent medium because of its refractive index (about 1.70 to 1.62). FIG. 2 is a chart correlating the refractive index of Plexiglas (polymethyl methacrylate) with the radiation wavelengths at the Cerenkov threshold. In the case of Plexiglas (polymethyl methacrylate), $n \simeq 1.7$ (in the UV) and one obtains $V_{threshold} \simeq 120$ kV. The Cerenkov radiation is time-resolved and follows quasi-instantaneously at about $10^{-13}$ seconds. With the 120 kV Cerenkov threshold in Plexiglas, the Cerenkov radiation wavelength at the threshold lies in the interval 150-200 mm, with corresponding index of refraction 1.70-1.62 and voltage threshold 120-139 kV. Note that a low-energy beam is very scattered in the Plexiglas (polymethyl methacrylate). The electron range is of the order of a few tenth of millimeters, for a plate thickness of 1 cm and the radiation pattern results from the incoherent addition of Cerenkov conical waves randomly oriented. Therefore the plate thickness should be carefully chosen in order to avoid scattering problems by minimizing the broadening of the emitting area. It is recommended that the thickness of the plexiglas plate 150 be between 3 and 10 mm.

Figure 3:
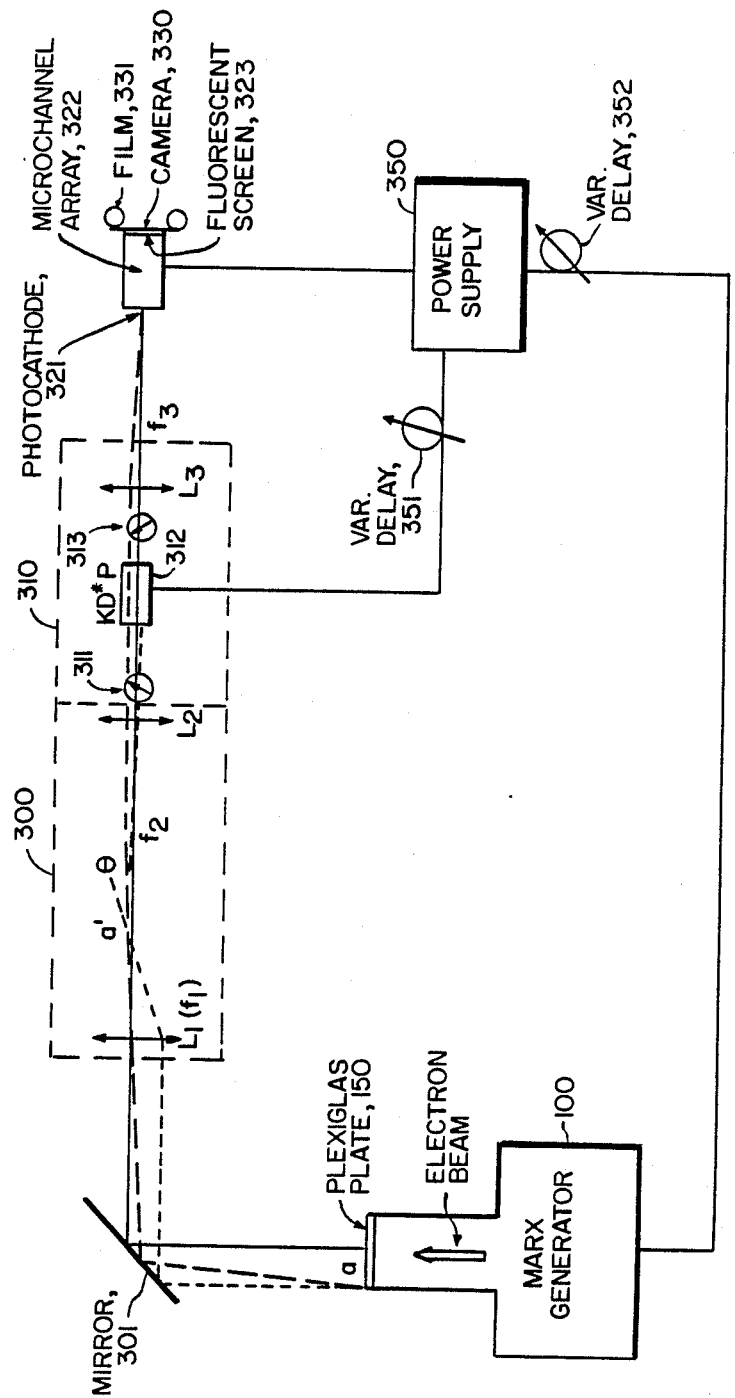
FIG. 3 is an electrical schematic of the imaging system of the present invention.

The reader's attention is now directed towards FIG. 3, which is a schematic of an imaging system which uses an embodiment of the present invention. The system of FIG. 3 generates Cerenkov radiation in the manner of the system of FIG. 1, as discussed above. Cerenkov radiation is generated by propagating an electron beam, from an electron beam source 100, through a Plexiglas (polymethyl methacrylate) plate 150.

A mirror 301 directs the Cerenkov radiation into a collimating optics system 300, which includes a first lens $l_1$ and a second lens $l_2$. Collimating systems are deemed to be known in the art, and need not be described in further detail, other than to note that the second lens $l_2$ directs collimated Cerenkov radiation into the electrooptic shutter 310. In one example of the present invention the first lens has a focal length of about 5 cm, and the second lens has a focal length of about 20 cm.

The electrooptic shutter 310 of FIG. 3 is composed of: a polarizer 311, a gated electrooptic crystal 312, and an analyzer 313. The principle behind this design is as follows. To take advantage of the time-instantaneous character of the Cerenkov process for real-time studies of the beam dynamics, one needs a very fast (subnanosecond) optical gate allowing the sampling of radiation. This requirement can be met by polarizing and collimating the incoming Cerenkov light, propagating it through an electrooptic crystal electrically gated and analyzing the output radiation. The time resolution of such a device can reach the picosecond range and a simple optical setup produces high-resolution two-dimensional images of the beam.

The polarizer 311 can be any one of a number of electrooptic modulators known in the art. An electrooptic modulator is a device that used an applied electric field to alter the polarization of light propagating through it. The operation of the polarizer 311 in the electrooptic shutter is discussed in conjunction with the operation of the electrooptic crystal below.

The electrooptic crystal 312 is composed of a material having a refractive index that can be altered by an applied electric field to produce the electrooptic effect. The practical application of this is an electrooptic shutter which is electrically controlled to allow Cerenkov radiation to propagate through it on a controllable basis. In the absence of an electric field, no light passes through it. In the presence of a picosecond pulse, a pulse of Cerenkov radiation passes through it for a picosecond.

The electrooptic effect results from the non-linear interaction of a low-frequency externally applied electric field $E_o$ with the electromagnetic wave field; the index of refraction of the electrooptic crystal 312 then varies as:

$$\Delta n = f r_{ij} n_o^3 E_o \quad (1)$$

where f is a numerical factor depending on crystal symmetry, $n_o$ is the zeroth-order index and $r_{ij}$ are the Pockels coefficients. In the case of 42 cm crystals of the tetragonal system, such as $KD_2PO_4$ (potassium dideuterium phosphate, or KDP) and for longitudinally applied $E_o$, f=1 and Equation 1 reduces to:

$$\Delta n = r_{63} n_o^3 E_o \quad (2)$$

where $\Delta n$ is now the difference in index for components polarized at $\pm 45°$ to the x-axis of the crystal; the electrooptic effect appears here as induced birefringence. At this point, it is clear that the crystal can be used to rotate the polarization of the incoming wave, proportionally to the external electric field $E_o$. The relative transmission of the device with crossed polarizers is given by:

$$T_{on} = \sin^2\left(\frac{\pi V}{2V_{\lambda/2}}\right) \quad (3)$$

where $V = dE_o$ is the externally applied voltage and the half-wave voltage is defined as:

$$V_{\lambda/2} = \frac{\lambda}{2r_{63}n_o^3} \quad (4)$$

A KDP crystal containing 99% Deuterium has a Pockels coefficient $r_{63} = 0.0264$ nm/V, refractive index $n_o(\lambda = 546.1 \text{ nm}) = 1.52$ and a half-wave voltage $V_{\lambda/2} = 2.945$ kV at this wavelength.

The electrooptic shutter 310 of FIG. 3 is capable of outputting a light pulse whose half-wave voltage varies with the wavelength, as seen in equation (4). Thus for a given applied voltage on the crystal 312 the different wavelength components of a non-monochromatic wave, such as Cerenkov radiation, will see different relative transmission $T_{on(\lambda)}$. Furthermore, because of the natural birefringence of the crystal, a highly collimated beam (plane waves) is required to reduce the photon leakage (transmission off) of the system with crossed polarizers. The relative leakage transmission for a ray of divergence angle $\theta$ in a crystal of extraordinary index $n_e$ and thickness d is given by:

$$T_{off} = \sin^2 \frac{\pi d(n_o^2 - n_e^2)\sin^2 \theta}{2\lambda n_o n_e^2} \quad (5)$$

To obtain a contrast ratio $T_{on}/T_{off} \approx 100$, the maximum acceptable divergence angle follows the approximate relation $\theta \approx \alpha\lambda/d$, where $\alpha \approx 2.10^4$ for KDP and $\theta$ is expressed in degrees.

Note that the gating time of an electrooptic shutter is ultimately limited according to the following considerations: on one hand, the ability to generate very short high voltage pulses ($\sim$kV/ps); on the other hand the fact that the crystal itself has a finite time-constant corresponding to the establishment of the non-linear polarization responsible for the electrooptic effect (penetration of the field, mobility of the electrons). These processes limit the rise time of the system to the picosecond range.

Because KDP crystals are uniaxial with fairly high birefringence, devices using them in the longitudinal configuration have a limited angular aperture. Beams with a finite divergence will not be uniformly retarded resulting in light leakage and subsequent decrease in contrast ratio. For diagnostic purposes using photographic techniques, this can be a serious drawback since one basically integrates the light flux over a long period of time $\Delta t$. In this case, the contrast obtained for a gate of width $\Delta t$ and a leakage transmission $T_{off}$ can be approximately defined as follows:

$$C = \frac{T_{on}\Delta t}{T_{off}\Delta t} - 1 \quad (6)$$

For a beam divergence of 1°, the contrast ratio $T_{on}/T_{off} \approx 100$ and in order to obtain C>10 for a 1 ns gate, one requires that the integrating time $\Delta t < 10$ ns. To obtain the small beam divergence required for a high contrast optical gate, one uses an afocal system as shown in FIG. 3. The first lens $L_1$, of focal length $f_1$ produces a small image (a') of the Plexiglas (polymethyl methacrylate) screen (a), $$-\frac{a'}{a} = \frac{1}{\frac{D}{f_1} - 1} \quad (7)$$

a second lens of focal $f_2$ produces a collimated beam of angular aperture:

$$\theta \sim \tan^{-1}(a'/f^2) \quad (8)$$

for a position:

$$L_1 L_2 = f^2 + \frac{1}{\frac{1}{f_1} - \frac{1}{D}} \quad (9)$$

where all distances are defined in FIG. 3. The collimated beam is polarized and apertured through the crystal, then analyzed by a second polarizer and focussed by a third lens to produce an image of the screen. The size of this final image can be varied, for a constant contrast (constant divergence angle), by changing the focal length $f_3$. For the system of FIG. 3, we used $D \sim 0.5$-$1.5$ m, $f_1 = 5$ cm, $f_2 = 20$ cm and $f_3 = 30$ cm, with a contrast ratio of the order of 100 and a final image size of $\sim 1$ cm (magnification $\sim 0.1$).

As seen above, the contrast limit imposed by the Cerenkov radiation requires a maximum integration time $\Delta$ of the order of 10 ns. The amount of light transmitted during an optical transmitted during an optical gate is very small (indeed, the photon density at focal plane of $L_3$ is generally below the threshold of the film used), and a light intensifier 320 (microchannel plate) must be used to produce images of the plexiglas plate. This amplifier comports a photocathode 321, a multichannel array 322, and a fluorescent screen 323; it is thus possible to pulse the bias voltage used to accelerate the photoelectrons in the microchannels and obtain a second optical gate with extremely high contrast. One suitable multichannel array 322 is the commercially available Varo Electron Devices #5772 Image Intensifier, composed of a 400 channels/mm² array distributed on a 3-cm² area, and having a gain of about $10^4$. The pulse applied to this system is 12 ns wide, allowing a contrast C=5 for a 720 ps gate on the electrooptic crystal. The gain obtained is of the order of $10^4$ and the spatial resolution is 400 channels per millimeter square. Different correlation measurements can be obtained by varying the relative delays of the crystal gate and the image intensifier gate and allowing the correct synchronization of the two systems.

It is believed that the image intensifier 320 and camera 330 of the system of FIG. 3 need not be described in further detail. Such optical elements are known in the art, as illustrated by the Nicholson et al patent. A description of other optical elements, which are useable in the present invention, is contained in an article entitled "Time-resolved studies of intense, relativistic electron beams with a subnanosecond Cerenkov electro-optic shutter" by F. Hartemann and G. Bekefi, which was published in Appl. Phys. Lett. 25 on Dec. 22, 1986, the disclosure of which is incorporated herein by reference.

The power supply system 350 which supports the system of FIG. 3 must have the following characteristics. First, for the electrooptic shutter 310 to operate, as described above, the power supply system 350 should be able to supply a pulse of 6 KV to gate the electrooptic crystal at about 750 picoseconds. Next, the image intensifier 320 needs to be supplied in a 12 ns pulse.

Finally, the power supply must supply power to the electron beam source 100. The power requirements to the electron beam source 100 will vary with the particular source selected. As mentioned above, commercially available sources may be used as long as they generated sufficient electron beams to exceed the voltage threshold to generate Cerenkov radiation.

As mentioned above, the KDP crystal 312 is triggered with a 750 picosecond voltage pulse ($\Delta \tau_1$) which has an amplitude of between two and six KV. The microchannel array 322 is triggered with a 12 nanosecond, 800 volt pulse ($\Delta \tau_2$). The amplified image produced on a scintillator screen is photographed on regular 35-mm film. With zero voltage on the crystal and an ideal, perfectly collimated light beam at normal incidence, no light should leak through the shutter with crossed polarizers. However, in practice, beams with a finite divergence will not be uniformly retarded in the birefringence crystal resulting in light leakage and subsequent decrease in contrast ratio. For diagnostic purposes using photographic techniques, this could be a serious drawback if one integrates the light flux over too long a period of time $\Delta \tau_2$. The contrast C obtained for a gate of width $\Delta 96_1$ on the crystal defined as $C = (T_{on} \Delta_1 / T_{off} \Delta_2) - 1$, where $T_{on}$ is the relative transmission of the electro-optic shutter with the voltage applied across the crystal, and $T_{off}$ is the leakage transmission with zero applied voltage. One finds that for an incident beam divergence of 1°, $T_{on}/T_{off} \simeq 100$. Thus, the pulse length $\Delta \tau_2$ of the MCP must be shorter than 12.5 ns to achieve a contrast $C > 5$ for a KDP gate $\Delta \tau_2 = 750$ ps; otherwise, the film will be excessively fogged by the background leakage light. This illustrates the critical role played by the microchannel array 322.

The system of FIG. 3 has been tested by passing a hollow electron beam through a cusped magnetic field at energies ranging from 100 to 250 keV; and real-time emittance measurements of a high quality 2 MeV electron beam.

In operation, the Plexiglas (polymethyl methacrylate) screen 150 is viewed in a mirror 301 to minimize the X-ray flux in the device. The gates, set relative to each other by correlation, can be triggered at different times with respect to the electron beam, thus allowing the sampling of Cerenkov radiation. It is possible to estimate the total amount of light radiated via the Cerenkov process for both experiments: from the Cauchy formula, $n(\lambda) \simeq a + b/\lambda^2$, one obtains the energy emitted per particle and per unit path length in a given wavelength interval $\lambda_1 \lambda_2$, $$\frac{dW}{dl} = 2\pi^2 e^2 \frac{\lambda_2^2 - \lambda_1^2}{\lambda_2^2 \lambda_1^2} \left[1 - \frac{1}{\beta^2 n(\lambda_1) n(\lambda_2)}\right] \quad (10)$$

For a number of particles, the radiation process is incoherent and the emitted waves do not interfere; we thus obtain, given the current density j of the beam and the Plexiglas (polymethyl methacrylate) thickness $\Delta l$, an expression for the total flux:

$$\phi = \frac{d^2 W}{dSdt} = \frac{j}{e} \frac{dW}{dl} \Delta l \quad (11)$$

The total power is simply given by:

$$P = \frac{I}{e} \frac{dW}{dl} \Delta 1 \qquad (12)$$

where I is the total current of the beam. For the visible part of the spectrum (300-600 nm). $n(\lambda_1)=1.51$. $n(\lambda_2)=1.55$. and we obtain the results listed below in Table I.

TABLE I

| Beam | V(MV) | j(A/cm$^2$) | β | I(A) | Δε(mm) | dW/dl(keV/cm) | φ(kW/$^2$cm) | P(kW) |
|---|---|---|---|---|---|---|---|---|
| Nereus | 0.200 | 10 | 0.69 | 400 | 10 | 0.25 | 2.5 | 100 |
| Pulserad | 2.0 | 100 | 0.97 | 2.5* | 3 | 1.34 | 40.3 | 1.00 |

Note, for emittance measurements, the beam is apertured down to a 5 × 5 square pattern of 0.1 A beamlets.

For the emittance measurements the beam is apertured, and the amount of light emitted is very small: about 44 W per beamlet. For an average wavelength of 450 nm, the photon energy is $hc/(\lambda) \simeq 2.75$ eV, and one obtains the average number of photons emitted per electron in the 3 mm plexiglas screen used for the emittance measurements: $N \simeq 145$. The total number of photons emitted by a beamlet ($I=0.1$ A for $\Delta t=750$ ps) is:

$$N_{tot} = \frac{I\Delta t}{e}(N) \simeq 6.8 \times 10^{10} \qquad (13)$$

The geometric ratio of light collected by the lens $L_1$ of radius $r=2.5$ cm and apertured through the crystal (radius $\delta=0.5$ cm) during the collimation is:

$$\sigma = \left(\frac{r}{2D}\right)^2 \left(\frac{f_1\delta}{f_2r}\right)^2 \simeq 1.5 \times 10^{-6} \qquad (14)$$

For a focal spot of 1 mm$^2$, illuminating 400 microchannels, and an overall transmission of 40 percent (including polarization losses), the average number of photons transmitted during the gate can be estimated as:

$$\frac{0.4}{400} \sigma N_{tot} \simeq 110 \qquad (15)$$

At this level, the quantum efficiency of the image intensifier 320 plays a significant role and the system works basically as a photon counter, thus introducing a certain grainyness in the pictures. In the case of the rotating electron beam experiment, the total amount of light emitted is higher and the pictures obtained are consequently sharper.

A device coupling the Cerenkov emission process to the electrooptic effect and demonstrated its capability to resolve subnanosecond events is described as part of the present invention. The system is particularly useful for the study of the interaction of an intense electron beam with a dielectric medium. The device can easily be improved for use in the 50 ps range and spectral studies of the emitted light may be added as a useful tool for the analysis of the particle dynamics. Furthermore, it is possible to produce extremely high intensity (~0.1 GW/cm$^2$) UV light by focussing the electron beam that interacts with the dielectric.

The requirement on the beam energy is $V > \sim 100$ kV and a current density $J > \sim 1$ A/cm$^2$ is necessary to obtain enough Cerenkov light for a 100 ps gate with a 1 cm plexiglas screen. It is also possible to obtain a fine sampling of the light pulse by successive shots and obtain a "movie" of the particular dynamics, allowing very detailed studies of the beam behavior.

Finally, it is worth noting that this versatile system, once calibrated and tuned by correlation, gives highly reproducible results and can be easily used for various diagnostic purposes. It is also a considerably less expensive device than a streak camera.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An imaging system which allows direct viewing of Cerenkov radiation samples on the subnanosecond time-scales, said imaging system comprising:
    a means for supplying electrical power;
    a polymethyl methacrylate plate which radiates said Cerenkov radiation when an electron beam with a voltage which exceeds a Cerenkov radiation threshold voltage is propagated through it, said Cerenkov radiation threshold voltage being about 120 kV, said polymethyl methacrylate plate having an index of refraction between 1.70 and 1.62;
    an electron beam source which directs said electron beam at said polymethyl methacrylate plate such that said voltage of said electron beam exceeds said Cerenkov radiation threshold voltage;
    a means for collimating said Cerenkov radiation which is received from said polymethyl methacrylate plate, said collimating means thereby outputting collimated Cerenkov radiation;
    a polarizer which receives and polarizes said collimated Cerenkov radiation from said collimating means to produce thereby polarized Cerenkov radiation;
    an electrooptic crystal having an adjustable refractive index which gates said polarized Cerenkov radiation received from said polarizer to produce a pulsed sample of said Cerenkov radiation, said pulsed sample having controllable durations which are adjusted as said adjustable refractive index is adjusted to allow said Cerenkov radiation to propagate through said electrooptic crystal in said pulsed sample such that said controllable duration may be adjusted to durations of less than a nanosecond, wherein said electrooptic crystal comprises a potassium deuterium phosphorous crystal containing about 99 percent deuterium, and has a Pockels coefficient of about 0.0264 nm/V, and a refractive index of 1.52 at wavelengths of 546.1 nm, said electrooptic crystal thereby gating said Cerenkov radiation into said pulsed sample when receiving 6.0 kV from said power supplying means for 750 picoseconds;
    a means for analyzing said pulsed sample of said Cerenkov radiation received from said electrooptic crystal;

an imaging intensifier which produced an output by receiving and amplifying said subnanosecond samples of Cerenkov radiation from said electrooptic crystal so that said samples of Cerenkov radiation will exceed a registration threshold of 35 mm film; and a camera which records said output of said image intensifier on 35 mm film to produce an image which represents beam dynamics of said Cerenkov radiation samples on subnanosecond time-scales.

2. A process which allows viewing of Cerenkov radiation beam dynamics at subnanosecond time-scales, said process comprising the steps of:

transmitting an electron beam with a beam voltage which exceeds a Cerenkov radiation threshold of 120 kV through polymethyl methacrylate plate with an index of refraction which is between 1.70 and 1.62 to produce said Cerenkov radiation;

sampling the Cerenkov radiation with an electrooptic shutter gated for a few hundred picoseconds, said sampling step producing a pulsed sample of said Cerenkov radiation with a controllable duration that may be adjusted to values of less than a nanosecond, wherein said sampling step comprises propagating said Cerenkov through an electrooptic crystal which is gated by an electric field which adjusts the refractive index of the electrooptic crystal to pass said pulsed sample for a few hundred picoseconds, said electrooptic crystal otherwise being opaque with respect to said Cerenkov radiation, and wherein said sampling step includes a use of a potassium deuterium phosphorous crystal which contains about 99 percent deuterium, and which has a Pockels coefficient of about 0.0264 nm/V, and a refractive index of 1.52 at wavelengths of 546.1 nm as said electrooptic crystal, said sampling step being conducted by supplying said electrooptic crystal with an electric voltage of about 6.0 kV for about 750 picoseconds; and displaying said pulsed sample of said Cerenkov radiation to allow viewing of Cerenkov radiation beam dynamics at subnanosecond time-scales, wherein said displaying step includes using an image intensifier to amplify said pulsed sample of said Cerenkov radiation so that it exceeds a registration threshold for 35 mm film, and then photographing an amplified pulsed sample of Cerenkov radiation on 35 mm film.

* * * * *